(12) United States Patent
Broker et al.

(10) Patent No.: US 11,635,220 B2
(45) Date of Patent: Apr. 25, 2023

(54) SYSTEMS AND METHODS FOR CHECKING STATUS OF A PRESSURE TRANSDUCER

(71) Applicant: Emerson Electric Co., St. Louis, MO (US)

(72) Inventors: John F. Broker, Warrenton, MO (US); Lily Wan, St. Louis, MO (US); Bradley C. Zikes, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 264 days.

(21) Appl. No.: 16/947,341

(22) Filed: Jul. 29, 2020

(65) Prior Publication Data

US 2022/0034536 A1 Feb. 3, 2022

(51) Int. Cl.
*F24F 11/38* (2018.01)
*G05B 15/02* (2006.01)
*G05B 19/048* (2006.01)
*F24F 11/49* (2018.01)

(52) U.S. Cl.
CPC ............ *F24F 11/38* (2018.01); *F24F 11/49* (2018.01); *G05B 15/02* (2013.01); *G05B 19/048* (2013.01); *G05B 2219/24015* (2013.01); *G05B 2219/2614* (2013.01); *G05B 2219/2642* (2013.01)

(58) Field of Classification Search
None
See application file for complete search history.

(56) References Cited

U.S. PATENT DOCUMENTS

| | | | |
|---|---|---|---|
| 7,771,113 B2 | 8/2010 | Corbet et al. | |
| 9,122,920 B1 | 9/2015 | Sacerio et al. | |
| 9,645,017 B2 | 5/2017 | Kramer et al. | |
| 10,024,591 B2 | 7/2018 | Goel et al. | |
| 10,061,330 B2 | 8/2018 | Douglas et al. | |
| 2008/0138750 A1* | 6/2008 | Kim | F23N 5/242 431/12 |
| 2010/0145660 A1 | 6/2010 | Lang et al. | |
| 2013/0216962 A1* | 8/2013 | Dresner | F23N 5/242 431/89 |
| 2015/0322902 A1* | 11/2015 | Akita | F02M 25/0836 123/519 |
| 2016/0123588 A1 | 5/2016 | Vie | |
| 2016/0169704 A1 | 6/2016 | Badeja et al. | |
| 2017/0146964 A1 | 5/2017 | Beals et al. | |
| 2020/0064009 A1 | 2/2020 | Ray et al. | |

FOREIGN PATENT DOCUMENTS

| | | | |
|---|---|---|---|
| JP | 2015135198 A | * | 7/2015 |
| JP | 2015135198 A | | 7/2015 |
| KR | 100717119 B1 | * | 9/2005 |

* cited by examiner

*Primary Examiner* — Kenneth M Lo
*Assistant Examiner* — Istiaque Ahmed
(74) *Attorney, Agent, or Firm* — Armstrong Teasdale LLP

(57) ABSTRACT

A method of controlling a gas furnace system includes determining a first pressure in a conduit coupled to a draft inducer from signals output by a pressure transducer positioned to sense a pressure within the conduit with a motor of the draft inducer in a stopped condition. A first status of the pressure transducer is determined based at least in part on the first pressure. The motor of the draft inducer is controlled to increase a speed of the motor from the stopped condition in response to a call for heat when the first status does not indicate that the pressure transducer is unreliable, and the motor is maintained in a stopped condition when the first status indicates that the pressure transducer is unreliable.

17 Claims, 2 Drawing Sheets

SYSTEMS AND METHODS FOR CHECKING STATUS OF A PRESSURE TRANSDUCER

FIELD

The field of the disclosure relates systems including a pressure transducer, and more particularly, to systems and methods for checking the status of a pressure transducer in an HVAC system.

BACKGROUND

Pressure switches are commonly used in HVAC systems to monitor when a pressure exceeds or drops below a predetermined threshold pressure. Such pressure switches are reliable technology, but only provide a limited amount of data. A pressure transducer may be used to monitor the inducer pressure in an HVAC system, especially to achieve low NOx emission. A pressure transducer outputs a voltage that is proportional (whether directly proportional or inversely proportional) to the pressure it senses from a hose in a conduit that connects to the sensor. The use of pressure transducers in HVAC systems is less established than pressure switches, and the reliability and accuracy of the pressure transducers is less established. As with all components, the pressure transducer may fail under certain conditions like humidity, dust, vibration, shock, overvoltage, etc. One failure mode observed results in the output of the pressure transducer being at a constant voltage instead of a value that varies according to the input pressure. Also, apparent pressure transducer failures may be the result of improper connections, such as the pressure transducer's ground pin not being connected properly in the adapter harness that goes from the pressure transducer to the control board. When the pressure transducer fails, it can negatively affect the product performance, potentially including making audible noise or generating CO. Because of this, it is desired to detect failures from these types of pressure transducers, notify a user of the status of the transducer, and/or prevent or stop operation when the pressure transducer has failed.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a gas furnace system includes a draft inducer, a pressure transducer, and a controller. The draft inducer includes a motor and is in fluid communication with a conduit. The pressure transducer is positioned to sense a pressure within the conduit and output signals proportional to the sensed pressure. The controller is connected to the draft inducer and the pressure transducer. The controller includes a processor programmed to determine a first pressure in the conduit from the signals output by the pressure transducer with the motor in a stopped condition, determine a first status of the pressure transducer based at least in part on the first pressure, control the motor of the draft inducer to increase a speed of the motor from the stopped condition in response to a call for heat when the first status does not indicate that the pressure transducer is unreliable, and maintain the motor in a stopped condition when the first status indicates that the pressure transducer is unreliable.

Another aspect is a controller for a gas furnace system including a draft inducer having a motor, and a pressure transducer positioned to sense a pressure within a conduit and output signals proportional to the sensed pressure. The controller includes a processor programmed to determine a first pressure in the conduit from the signals output by the pressure transducer with the motor in a stopped condition, determine a first status of the pressure transducer based at least in part on the first pressure, control the motor of the draft inducer to increase a speed of the motor from the stopped condition in response to a call for heat when the first status does not indicate that the pressure transducer is unreliable, and maintain the motor in a stopped condition when the first status indicates that the pressure transducer is unreliable.

Another aspect is a method of controlling a gas furnace system. The method includes determining a first pressure in a conduit coupled to a draft inducer from signals output by a pressure transducer positioned to sense a pressure within the conduit with a motor of the draft inducer in a stopped condition. A first status of the pressure transducer is determined based at least in part on the first pressure. The motor of the draft inducer is controlled to increase a speed of the motor from the stopped condition in response to a call for heat when the first status does not indicate that the pressure transducer is unreliable, and the motor is maintained in a stopped condition when the first status indicates that the pressure transducer is unreliable.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION

For conciseness, examples will be described with respect to a gas powered furnace. However, the methods and systems described herein may be applied to any suitable system or appliance including a pressure controlled or influenced by another controlled component.

Figure 1:
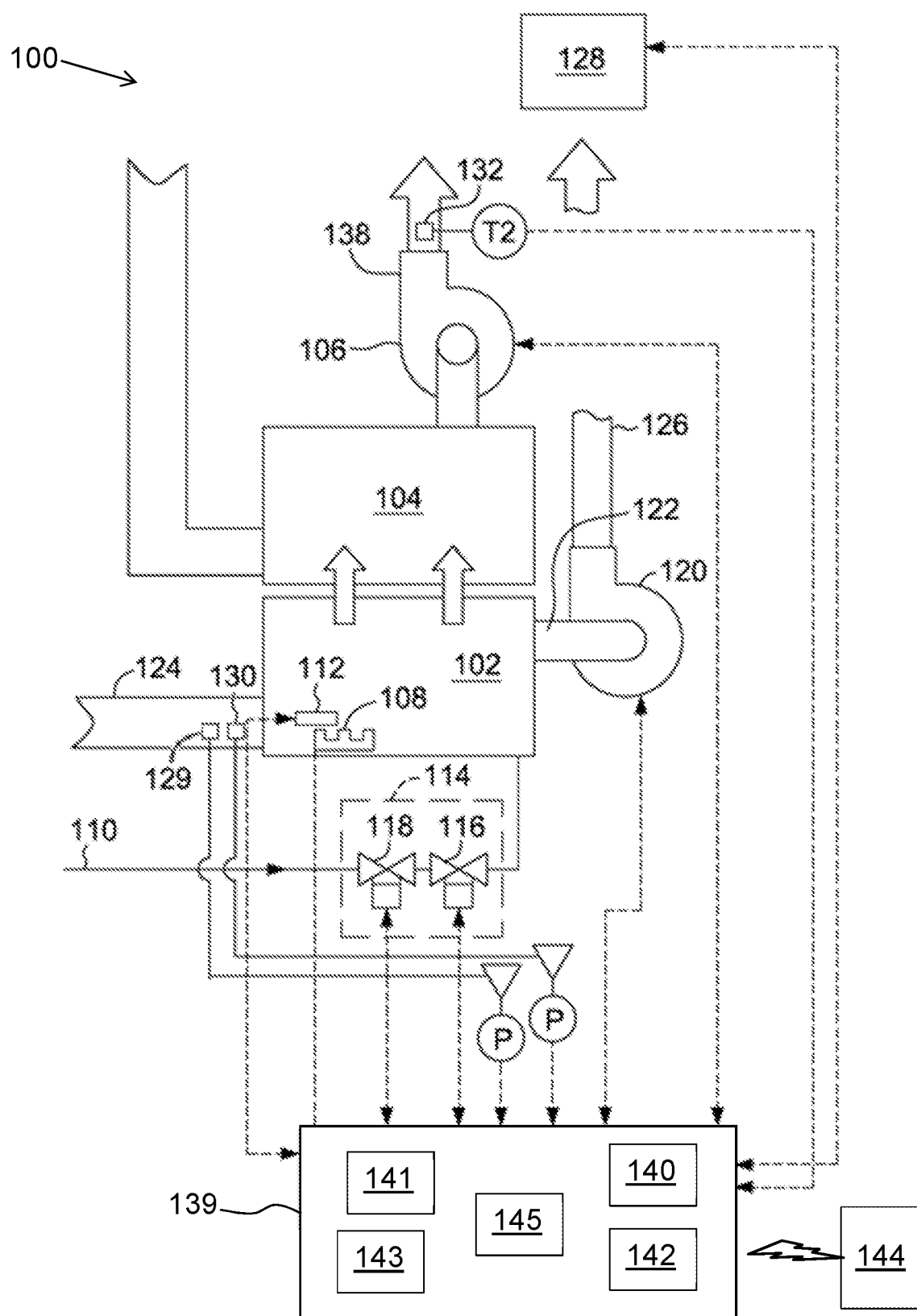
FIG. 1 is a schematic diagram of a gas furnace system including a furnace control system.

Referring initially to FIG. 1, a gas furnace system of one embodiment for heating a temperature controlled environment is indicated generally at 100. The gas furnace system 100 generally includes a combustion chamber 102 for generating heat from combustible gases, a heat exchanger 104, and an air circulator 106 for circulating fluid (e.g., air) past the heat exchanger 104 to transfer heat generated by the combustion chamber 102 to the circulating fluid.

The combustion chamber 102 includes a burner assembly 108 connected to a gas fuel supply (not shown) via a gas inlet 110, and an ignition device 112, such as a hot surface ignitor, a spark ignitor, an intermittent pilot, or the like configured to ignite an air/fuel mixture within the combustion chamber 102. The burner assembly 108 includes one or more burners through which fuel gas is fed. The supply of fuel gas to the burner assembly 108 is controlled by a gas valve assembly 114, which, in the illustrated embodiment, includes a main burner valve 116 and a safety valve 118. In embodiments in which the ignition device 112 is an intermittent pilot, a supply of fuel gas to the intermittent pilot is controlled by a pilot gas valve (not shown).

An inducer blower 120 (also referred to as a draft inducer) is connected to the combustion chamber 102 by a blower inlet 122. The inducer blower 120 is configured to draw fresh (i.e., uncombusted) air into the combustion chamber 102 through an air inlet 124 to mix fuel gas with air to provide a combustible air/fuel mixture. The inducer blower 120 is also configured to force exhaust gases out of the combustion chamber 102 and vent the exhaust gases to atmosphere through an exhaust outlet 126. The inducer blower 120 includes a motor (not shown), that drives a fan, impeller, or the like to move air.

The combustion chamber 102 is fluidly connected to the heat exchanger 104. Combusted gases from the combustion chamber 102 are circulated through the heat exchanger 104 while the air circulator 106 forces air from the temperature controlled environment into contact with the heat exchanger 104 to exchange heat between the heat exchanger 104 and the temperature controlled environment. The air circulator 106 subsequently forces the air through an outlet 138 and back into the temperature controlled environment.

The operation of the system 100 is generally controlled by a furnace control system 139, which includes a safety system 140, a fan control 142, a processor 141, a memory 143, a spark ignition controller 145, and a thermostat 128 connected to the furnace control system 139. Other embodiments may use hot surface ignition or a pilot rather than direct spark ignition using a spark ignition controller. The thermostat 128 is connected to one or more temperature sensors (not shown) for measuring the temperature of the temperature controlled environment. The furnace control system 139 is connected to each of the gas valve assembly 114, the ignition device 112, the inducer blower 120, and the air circulator 106 for controlling operation of the components in response to control signals received from the thermostat 128. Generally, the fan control 142 controls operation of the air circulator 106 and inducer blower 120, and the safety system 140 monitors and protects against safety failures (such as failure of ignition during an attempt to light gas at the burner assembly 108). The spark ignition controller 145 controls the main gas valve, the pilot gas valve (if applicable), and the ignition device 112 to ignite gas at the burner assembly 108 when desired. The spark ignition controller 145 is also communicatively connected to a flame sensor 136 (shown in FIG. 2) that detects whether or not a flame has been ignited on the burner assembly 108 and/or on an intermittent pilot (where applicable). Moreover, in some embodiments, one or both of the safety system 140 and the fan control 142 are integrated with the spark ignition controller 145. In still other embodiments, the spark ignition controller 145 functions are performed by the furnace control system 139 without a separate spark ignition controller 145. A mobile device 144, such as a mobile phone, a tablet computing device, a laptop computing device, a smart watch, or the like, may be used for wireless communication with the furnace control system 139 and/or the spark ignition controller 145. Other embodiments are not configured for communication with a mobile device 144.

The processor 141 is configured for executing instructions to cause the furnace control system 139 to perform as described herein. In some embodiments, executable instructions are stored in the memory 143. The processor 141 may include one or more processing units (e.g., in a multi-core configuration). The memory 143 is any device allowing information such as executable instructions and/or other data to be stored and retrieved. The memory 143 may include one or more computer-readable media. The memory 143 stores computer-readable instructions for control of the system 100 as described herein. The term processor, as used herein, refers to central processing units, microprocessors, microcontrollers, reduced instruction set circuits (RISC), application specific integrated circuits (ASIC), logic circuits, and any other circuit or processor capable of executing the functions described herein. The above are examples only, and are thus not intended to limit in any way the definition and/or meaning of the term "processor." The memory may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of data, instructions, and/or a computer program.

Figure 2:
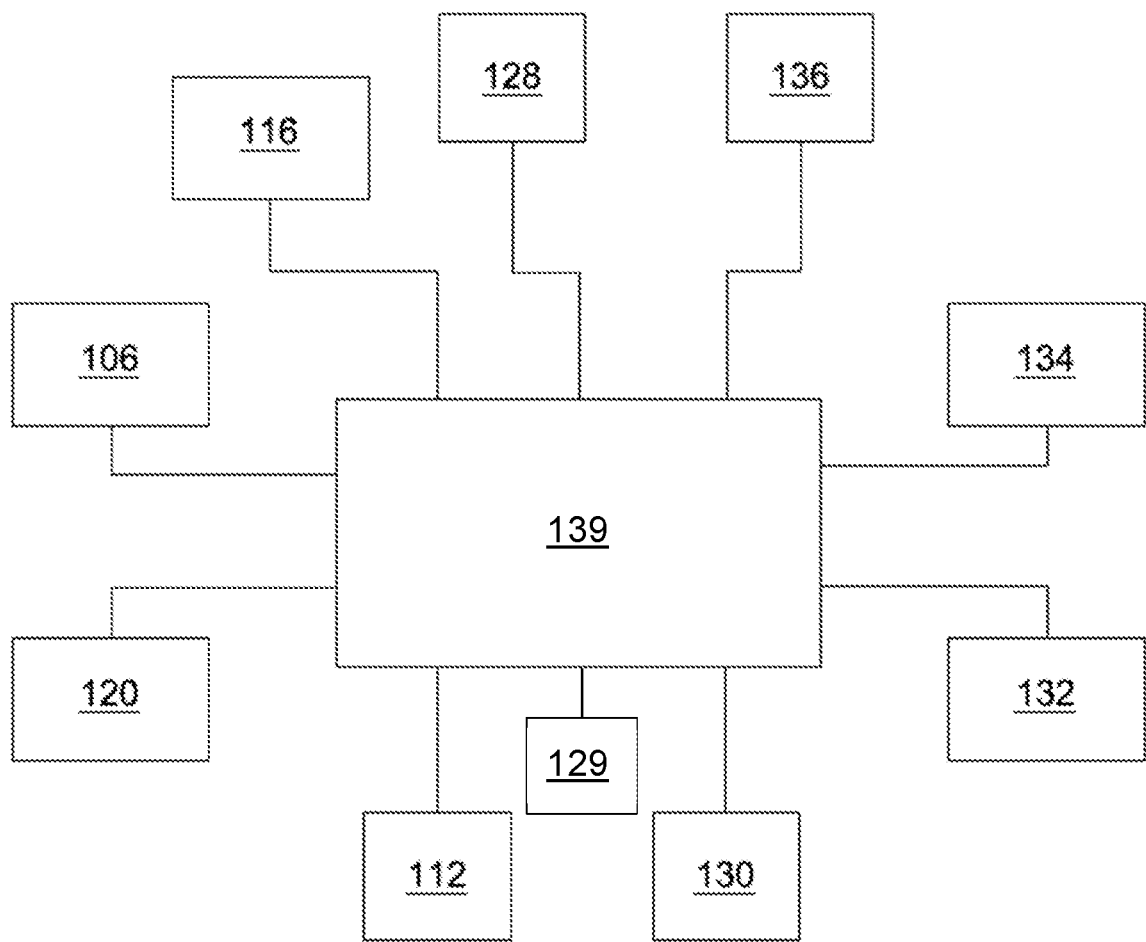
FIG. 2 is a block diagram of the furnace controller of FIG. 1 and component connections of the gas furnace system of FIG. 1.

With additional reference to FIG. 2, the system 100 includes a plurality of sensors and detectors for monitoring the environmental and operating conditions of the system 100. The illustrated furnace system includes a pressure transducer 129, a pressure switch 130, a temperature sensor 132, a flame rollout detector 134, and a flame sensor 136. The furnace control system 139 is connected to each of the pressure transducer 129, the pressure switch 130, the temperature sensor 132, the flame rollout detector 134, and the flame sensor 136, and is configured to control the furnace system 100 based on signals received from the sensors and detectors. Other embodiments do not include the pressure switch 130, and include only the pressure transducer 129.

The pressure switch 130 is configured to provide a pressure indication to the furnace control system 139 indicative of the pressure within the combustion chamber 102. The enclosed space (e.g., the combustion chamber 102, the inlet 124, etc.) whose pressure the pressure switch 130 is measuring is sometimes referred to herein as a conduit. The pressure switch 130 includes an open/close switch that is opened when a detected pressure is below a threshold pressure limit (also referred to as a predetermined pressure or a predetermined threshold) and closed when a detected pressure is above the threshold pressure limit. The pressure transducer 129 includes an analog and/or digital sensor configured to output an analog and/or digital signal indicative of an actual or relative pressure to the furnace control system 139. In the illustrated embodiment, the pressure switch 130 and the pressure transducer 129 are positioned proximate the air inlet 124, and configured to detect the pressure of fresh air being supplied to the combustion chamber 102. In other suitable embodiments, the pressure switch 130 and the pressure transducer 129 may be positioned at any suitable location within the furnace system 100 that allows the furnace system to function as described herein including, for example and without limitation, within the combustion chamber 102 and within the blower inlet 122.

The temperature sensor 132 is configured to provide a temperature indication to the furnace control system 139 indicative of a temperature T2 within the furnace system 100. In the example embodiment, the temperature sensor 132 includes an open/close switch that is opened when a detected temperature is above a threshold temperature limit and closed when a detected temperature is below the threshold pressure limit. In other suitable embodiments, the temperature sensor 132 includes an analog and/or digital sensor configured to output an analog and/or digital signal indicative of an actual or relative temperature to the furnace control system 139. In the illustrated embodiment, the temperature sensor 132 is positioned proximate the heat exchanger 104, and is configured to detect a high temperature condition within the heat exchanger 104. That is, the temperature sensor 132 is configured to communicate with furnace control system 139 to indicate the presence of a high temperature condition (e.g., a detected temperature above a threshold temperature limit) within the heat exchanger 104.

The flame rollout detector 134 is configured to detect a flame rollout condition within the furnace system 100, and communicate with the furnace control system 139 to indicate that a flame rollout condition has been detected. The term "flame rollout condition" refers to a condition in which the combustion of the air/fuel mixture occurs outside of the normal combustion area within the combustion chamber 102. For example, if the exhaust outlet 126 is impeded during operation, flames that are normally confined to an area immediately adjacent the burner assembly 108 may spread to other areas of the furnace system 100, such as outside the combustion chamber 102, creating a risk of damaging components of the furnace system 100. Flame rollout detector 134 is configured to detect a flame rollout condition to prevent abnormal operation of furnace system 100 and potential damage to components of the furnace system 100. The flame rollout detector 134 may include any suitable detectors and/or sensors that enable the flame rollout detector 134 to function as described herein including, for example and without limitation, temperature sensors, pressure transducers, and optical detectors. In the example embodiment, the flame rollout detector 134 includes an open/close switch that is opened when a flame rollout condition is detected, and closed when the flame rollout condition is no longer detected. In other suitable embodiments, the open/close switch may only be closed following the detection of a flame rollout condition with human intervention (e.g., by resetting the furnace control system 139).

The flame sensor 136 is configured to detect the presence of a flame at the burner assembly 108, and communicate with the furnace control system 139 to indicate the presence or absence of a flame. The flame sensor 136 may include any suitable sensor and/or detector for detecting the presence of a flame including, for example and without limitation, thermo-electric devices (e.g., thermopiles), and optical flame detectors.

Components of the furnace system 100, such as the main burner valve 116, the ignition device 112, the inducer blower 120, the pressure switch 130, the temperature sensor 132, the flame rollout detector 134, and the flame sensor 136, may be electrically connected to the furnace control system 139 by one or more wiring harnesses. In one suitable embodiment, for example, the main burner valve 116, the pressure switch 130, the temperature sensor 132, the flame rollout detector 134, and the flame sensor 136 are each electrically connected to the furnace control system 139 by a primary or main wiring harness, and the ignition device 112 and the inducer blower 120 are each electrically connected to the furnace control system 139 by a secondary wiring harness.

A wiring harness is an assembly of cables or wires bound or secured together by suitable means including, for example and without limitation, straps, cable ties, cable lacing, sleeves, electrical tape, conduit, and combinations thereof. The wiring harnesses used to connect components of the furnace system 100 to the furnace control system 139 may include a harness connector adapted to mate with a complementary harness connector mounted on the furnace control system 139, described in more detail below. In one suitable embodiment, for example, a wiring harness of the furnace system 100 includes a male harness connector adapted to mate with a female harness connector mounted on the furnace control system 139.

In operation, the thermostat 128 transmits a call for heat to the furnace control system 139 (e.g., in the form of an electrical signal) when a detected temperature within the temperature controlled environment falls below a pre-determined temperature limit. Upon receiving a call for heat, the furnace control system 139 checks the environmental and operating conditions of the furnace system 100 using one or more of the pressure switch 130, the temperature sensor 132, the flame rollout detector 134, and the flame sensor 136 to ensure the temperature, pressure, and/or other conditions of the furnace system 100 are within predetermined limits. In the example embodiment, the furnace control system 139 outputs a signal to each of the temperature sensor 132 and the flame rollout detector 134 to confirm that the open/close switch of each of the sensors is in the closed position.

Once the environmental and/or operational conditions check is completed, the furnace control system 139 transmits a signal to the inducer blower 120 to energize the inducer blower 120. The furnace control system 139 may check the pressure within the furnace system 100 using the pressure switch 130 to ensure an adequate supply of fresh (i.e., uncombusted) air is being supplied into the combustion chamber 102. In the example embodiment, the furnace control system 139 outputs a signal to the pressure switch 130 to confirm that the open/close switch of the pressure switch 130 is in the closed position.

The furnace control system 139 then outputs a signal to the main burner valve 116 to open the main burner valve 116 and enable the supply of fuel gas to the burner assembly 108. Before, during, or after opening the main burner valve 116, the furnace control system 139 outputs a signal to the ignition device 112 to energize the ignition device 112 and ignite the air/fuel mixture within the combustion chamber 102. Where the ignition device 112 is a hot surface ignitor, such as in the example embodiment, the furnace control system 139 may energize the ignition device 112 prior to energizing the main burner valve 116 to allow the ignition device 112 sufficient time to heat up to a temperature sufficient to initiate combustion. Where the ignition device 112 is an intermittent pilot, the furnace control system 139 energizes the pilot burner valve (not shown) and ignites the intermittent pilot prior to energizing the main burner valve 116.

The furnace control system 139 may then check whether flame initiation was successful via the flame sensor 136. For example, the flame sensor 136 may output a signal to the furnace control system 139 indicating the presence of a flame in the combustion chamber 102. If no flame is detected by flame sensor 136, the furnace control system 139 may de-energize one or more of the main burner valve 116, the ignition device 112, and the inducer blower 120, and reattempt to initiate combustion within the combustion chamber 102. If the flame sensor 136 detects the presence of a flame, the furnace control system 139 energizes the air circulator 106 to circulate air across the heat exchanger 104 and into the temperature controlled environment via outlet 138.

When the call for heat has been satisfied (i.e., when the detected temperature in the temperature controlled environment is equal to or greater than a pre-determined temperature limit), the thermostat 128 outputs a signal to the furnace control system 139 to indicate the call for heat has been satisfied. The furnace control system 139 then de-energizes the main burner valve 116, the inducer blower 120, the ignition device 112, and the air circulator 106. The furnace control system 139 may maintain the inducer blower 120 and/or the air circulator 106 in an energized state for a preset delay period after receiving the signal to terminate the heat cycle.

In order to ensure that the pressure transducer 129 is functioning properly (i.e., that it is reliable), the furnace control system 139 executes a pressure transducer self-check. The processor 141 is configured to perform the algorithm, such as by instructions stored in the memory 143.

A first implementation of the pressure transducer self-check utilizes both the pressure transducer 129 and the pressure switch 130. As noted above, pressure switches are established and reliable technology in HVAC systems. Thus, the first implementation determines the status of the pressure transducer 129 at least in part based on comparison with the pressure switch 130.

Specifically, the processor 141 of the furnace control system 139 receive pressure signals output by the pressure transducer 129 and receives signals indicating whether the pressure switch 130 is in a first state or a second state. The pressure switch 130 is in the first state (e.g., closed) when the sensed pressure is below a predetermined pressure and it switches to the second state (e.g., open) when the sensed pressure reaches or exceeds the predetermined pressure. In this embodiment, the pressure being sensed is a negative pressure, and as the negative pressure exceeds a predetermined negative pressure the pressure switch closes. Oher embodiments may sense a positive pressure, in which case as the positive pressure exceeds a predetermined positive pressure, the pressure switch closes. In both positive and negative pressure embodiments, the pressure switch switches to the second state when the absolute value of the pressure reaches or exceeds a predetermined pressure. For conciseness and clarity, the embodiments will be described herein with reference merely to pressure and exceeding a predetermined pressure without distinguishing between negative and positive pressure, and without repeatedly identifying the pressure as the absolute value of the pressure. The processor 141 controls the motor of the draft inducer 120 in response to a call for heat and determines a first status of the pressure transducer 129 based at least in part on the received pressure signals from the pressure transducer 129 and the signals indicating whether the pressure switch 130 is in the first state or the second state.

Because the pressure transducer 129 and the pressure switch 130 are both positioned to be responsive to the same pressure, when the pressure switch 130 switches from the first state to the second state at the predetermined pressure, the pressure transducer 129 should measure a pressure approximately equal to the predetermined pressure. In other embodiments, the pressure transducer 129 and the pressure switch 130 are not positioned to be responsive to the same pressure, but are positioned to be responsive to related pressures, and a correlation between the related pressures is calculated and used to determine the pressure that should be sensed by the pressure transducer 129 when the pressure switch 130 changes state. The processor 141 determines the status of the pressure transducer 129 as reliable if the signals from the pressure transducer 129 indicate a pressure equal to or within a predetermined range (above or below) the predetermined pressure of the pressure switch 130 at the time when the pressure switch changed from the first state to the second state. For example, the status may be reliable when the measured pressure is within 1%, 5%, 10%, 20%, etc. of the predetermined pressure of the pressure switch 130. Alternatively, the range may be given as a range of specific pressures. Further, there may be two or more ranges that are used to determine three possible statuses (e.g., reliable, questionable/needs repair, unreliable) of the pressure transducer. For example, a measurement within 5% of the predetermined pressure may indicate a reliable pressure transducer 129, while a measurement between 5% and 10% indicates a pressure transducer 129 that has questionable reliability or possibly needs repair/replacement. Finally, a measurement more than 10% (in this example) away from the predetermined pressure may indicate an unreliable pressure transducer 129.

If the first status indicates that the pressure transducer is not unreliable, the processor 141 continues to operate the draft inducer 120. If the status indicates a questionable pressure transducer 129 (in embodiments using such additional ranges), the processor 141 may output an alert or warning to a user of the system. The alert may be a human cognizable alert, such as a visual or audible alert (e.g., displayed on the user's thermostat), or may be an electronic alert, such as a message sent to a remote computing device. When the first status indicates that the pressure transducer is unreliable, the processor 141 stops operating the draft inducer 120. The processor 141 will also generate an alert in this case, to notify the user that the system has a fault and will not operate.

In some embodiments, after determining the first status, the processor 141 controls the motor of the draft inducer 120 to decrease the speed of the motor until the pressure switch 130 switches back from the second state to the first state. The processor 141 then determines a second pressure in the conduit from the signals output by the pressure transducer 129 when the pressure switch switches from the second state to the first state. The processor 141 compares the second pressure to the predetermined pressure, and determines a second status of the pressure transducer 129 based at least in part on the comparison of the second pressure to the predetermined pressure. In some embodiments, the predetermined pressure when switching from the first state to the second state is different than when switching from the second state to the first state. In such embodiments, the pressure transducer 129 must pass both the first and second statuses (i.e., both comparisons must indicate that the transducer is not unreliable) to be considered reliable. In other embodiments, the predetermined pressure is the same in both directions. In such embodiments, the first and second pressures may be averaged and compared to the predetermined pressure to determine the status, or the pressure transducer 129 may need to separately pass both the first and second statuses. In some embodiments, a status is not determined until the pressure switch has switched state in both directions and both pressure transducer pressures have been acquired (e.g., there is only a first status based on the first and second pressure and the predetermined pressure).

After determining the second status, the processor 141 controls the draft inducer 120 motor to increase the speed of the motor at least until the pressure switch 130 again switches from the first state to the second state if the second status does not indicate that the pressure transducer 129 is unreliable. If the second status indicates that the pressure transducer 129 is unreliable, the processor stops the motor. In some embodiments, a third comparison similar to the first comparison above is performed when the pressure switch again switches from the first state to the second state. In other embodiments, there is no third comparison, and the processor continues normal operation if the first and/or second statuses indicate the pressure transducer 129 is not unreliable.

A second implementation of the pressure transducer self-check does not utilize the pressure switch 130, and may be used in systems with or without a pressure switch 130. In an example of the second implementation, the pressure measured by the pressure transducer 129 is checked three different times: before the inducer starts operating, after the inducer has started, and after the inducer speed has reached a desired pressure setpoint. Other embodiments may use only one or two of the three checks.

In this implementation, the processor 141 checks the pressure reading from the pressure transducer 129 without the draft inducer 120 on. This can be at any time before the draft inducer 120 is turned on to establish a reading before any pressure is developed by the motor. Generally, this check is performed right before the draft inducer 120 is turned on, such as upon receipt of a call for heat. The ambient pressure measured by the pressure transducer 129 without the draft inducer 120 on should be a value that is above some lower level and below some upper level. This will typically be a value within a range of pressures around zero (ambient pressure), depending on the particular transducer used. Here the first status can be determined as one of two or three conditions: reliable/unreliable or reliable/questionable/unreliable. In a three condition system, the pressure transducer 129 is determined to be unreliable if the measured pressure is below a low bad threshold or above a high bad threshold. Reliable would be above a low good threshold that is above the low bad threshold and below a high good threshold that is below the high bad threshold. Questionable would be pressure reading in the band between the low bad threshold and the low good threshold, or above the high good threshold and below the high bad threshold. In a two condition system, there is only one upper threshold and one lower threshold (also referred to as a range around an expected pressure). If the pressure is between the upper and lower thresholds, the pressure transducer 129 is reliable, and if the pressure is above the upper threshold or below the lower threshold, the pressure transducer is unreliable. In either system, if the sensed pressure is in the unreliable range, the processor 141 reports an error and does not proceed with a heat call. If it is in the questionable range, the processor continues with the heat call and issues an alert or a warning as discussed in the first implementation. In some embodiments, the processor 141 operates the system at a reduced capacity when the status indicates that the pressure transducer 129 is questionable. If the status indicates that the pressure transducer 129 is reliable, the processor 141 operates the system as normal.

Blowing wind may affect the pressure being measured by the pressure transducer 129. Thus, the questionable range may be set to account for expected variations on pressure due to expected amounts of wind. However, excessive wind may push the pressure readings into the unreliable range. Thus, in some embodiments, when checking the pressure without the draft inducer 120 on, the processor 141 will initially run the inducer 120 even if the sensed pressure is in the unreliable range in order to determine if the pressure transducer 129 responds as expected. If wind has affected the sensed pressure, running the inducer will cause the sensed pressure to change in the expected direction. If the processor 141 detects a change in the signal from the pressure transducer 129 in the expected direction when the draft inducer 120 begins to run, the processor 141 operates the system as normal. If, however, the signal from the pressure transducer 129 does not begin to move in the expected direction shortly after the draft inducer 120 begins to run, the processor 141 determines that the pressure transducer is unreliable, reports an error, stops running the inducer, and does not proceed with a heat call. Alternatively, the processor 141 may run the draft inducer 120 until the second check is performed.

If the pressure transducer 129 was determined not to be unreliable (i.e., it is reliable or questionable), the processor 141 continues responding to the call for heat and operates the draft inducer 120. AS the draft inducer 120 speeds up and the pressure builds, but before reaching the desired setpoint, the processor 141 performs the second check. Specifically, the processor 141 check the slope of the pressure signal verses the draft inducer 120 speed. There should be a positive slope in the pressure signal that is above a minimum and below a maximum slope for the expected pressure rise versus the speed. This speed can be based on a commanded or expected speed based on the signals sent to the draft inducer, or it can be an actual sensed speed of the draft inducer 120 motor. As the speed in increased and the pressure increases, there is a pressure range within a pressure from a properly functioning pressure transducer and inducer motor should appear. This range can again be divided into two or three groups: reliable/unreliable or reliable/questionable/unreliable. In a three condition system, the pressure transducer 129 is determined to be unreliable if the measured pressure is below a low bad threshold or above a high bad threshold. Reliable would be above a low good threshold that is above the low bad threshold and below a high good threshold that is below the high bad threshold. Questionable would be pressure reading in the band between the low bad threshold and the low good threshold, or above the high good threshold and below the high bad threshold. In a two condition system, there is only one upper threshold and one lower threshold (also referred to as a range around an expected pressure). If the pressure is between the upper and lower thresholds, the pressure transducer 129 is reliable, and if the pressure is above the upper threshold or below the lower threshold, the pressure transducer is unreliable. In either system, if the sensed pressure is in the unreliable range, the processor 141 reports an error, stops the draft inducer 120, and does not proceed with a heat call. If it is in the questionable range, the processor continues with the heat call and issues an alert or a warning as discussed in the first implementation. In some embodiments, the processor 141 operates the system at a reduced capacity when the status indicates that the pressure transducer 129 is questionable. If the status indicates that the pressure transducer 129 is reliable, the processor 141 operates the system as normal.

The final check compares the value of the pressure sensed by the pressure transducer 129 to the expected pressure at the current inducer speed after reaching the desired pressure setpoint. As with the first and second checks, there can be two or three possible statuses: reliable/unreliable or reliable/questionable/unreliable. In a three condition system, the pressure transducer 129 is determined to be unreliable if the measured pressure is below a low bad threshold or above a high bad threshold. Reliable would be above a low good threshold that is above the low bad threshold and below a high good threshold that is below the high bad threshold.

Questionable would be pressure reading in the band between the low bad threshold and the low good threshold, or above the high good threshold and below the high bad threshold. In a two condition system, there is only one upper threshold and one lower threshold (also referred to as a range around an expected pressure). If the pressure is between the upper and lower thresholds, the pressure transducer 129 is reliable, and if the pressure is above the upper threshold or below the lower threshold, the pressure transducer is unreliable. In either system, if the sensed pressure is in the unreliable range, the processor 141 reports an error, stops the draft inducer 120, and does not proceed with a heat call. In other embodiments, the processor may perform an additional check before making a final determination the pressure transducer is in the unreliable range. Alternatively, the processor may treat the sensed pressure as if it were in the questionable range if the first two checks (before running the inducer and before reaching the desired setpoint) indicated that the pressure transducer is reliable. If it is in the questionable range, the processor continues with the heat call and issues an alert or a warning as discussed in the first implementation. In some embodiments, the processor 141 operates the system at a reduced capacity when the status indicates that the pressure transducer 129 is questionable. If the status indicates that the pressure transducer 129 is reliable, the processor 141 operates the system as normal.

The various embodiments described above may be separated and combined in various forms. For example, systems using the three checks of the pressure transducer may also check the pressure transducer against the pressure switch. Other embodiments may perform less than all three checks of the pressure transducer, such as only performing the first check, the second check, or the third check, or only performing two of the first, second, and third checks. Again, these one or two checks may also be combined with checking the pressure transducer against the pressure switch.

Example embodiments of gas-powered furnace systems and furnace controllers are described above in detail. The system and controller are not limited to the specific embodiments described herein, but rather, components of the system and controller may be used independently and separately from other components described herein.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing (s) shall be interpreted as illustrative and not in a limiting sense.

What is claimed is:

1. A gas furnace system comprising:
a draft inducer including a motor, the draft inducer in fluid communication with a conduit;
a pressure transducer positioned to sense a pressure within the conduit and output signals proportional to the sensed pressure;
a controller connected to the draft inducer and the pressure transducer, the controller comprising a processor programmed to:
determine a first pressure in the conduit from the signals output by the pressure transducer with the motor in a stopped condition;
determine a first status of the pressure transducer based at least in part on the first pressure;
control the motor of the draft inducer to increase a speed of the motor from the stopped condition in response to a call for heat when the first status does not indicate that the pressure transducer is unreliable; and
maintain the motor in a stopped condition when the first status indicates that the pressure transducer is unreliable,
wherein the processor is programmed to determine the first status by:
determining that the pressure transducer is not unreliable when the first pressure is within an expected range of pressures;
determining that the pressure transducer is not unreliable when the first pressure is not within an expected range of pressures, but controlling the motor of the draft inducer to increase the speed of the motor causes the signals output by the pressure transducer to change in an expected manner; and
otherwise determining that the pressure transducer is unreliable.

2. The gas furnace system of claim 1, wherein the processor is programmed to:
determine a second pressure in the conduit from the signals output by the pressure transducer after the controller has begun increasing the speed of the motor from the stopped condition in response to a call for heat;
determine a second status of the pressure transducer based at least in part on the second pressure;
continue operating the motor when the second status does not indicate that the pressure transducer is unreliable; and
stop the motor when the second status indicates that the pressure transducer is unreliable.

3. The gas furnace system of claim 2, wherein the processor is programmed to:
determine a slope of the signals output by the pressure transducer; and
determine the second status of the pressure transducer pressure based at least in part on the determined slope.

4. The gas furnace system of claim 3, wherein the processor is programmed to:
determine a speed of the motor of the draft inducer when the second pressure is determined; and
determine the second status of the pressure transducer based on the determined slope and the determined speed.

5. The gas furnace system of claim 2, wherein the processor is programmed to:
determine a speed of the motor of the draft inducer when the second pressure is determined; and
determine the second status of the pressure transducer based on the second pressure and the determined speed of the motor of the draft inducer when the second pressure is determined.

6. The gas furnace system of claim 2, wherein the processor is programmed to:

determine the second pressure before a desired pressure set point for the call for heat is expected by the controller to have been reached;

determine a third pressure in the conduit from the signal output by the pressure transducer after desired pressure set point for the call for heat is expected by the controller to have been reached;

determine a speed of the motor of the draft inducer when the third pressure is determine;

determine a third status of the pressure transducer based at least in part on the third pressure and the speed of the motor of the draft inducer when the third pressure is determined;

continue operating the motor when the third status does not indicate that the pressure transducer is unreliable; and stop the motor when the third status indicates that the pressure transducer is unreliable.

7. A controller for a gas furnace system including a draft inducer having a motor, and a pressure transducer positioned to sense a pressure within a conduit and output signals proportional to the sensed pressure, the controller, the controller comprising a processor programmed to:

determine a first pressure in the conduit from the signals output by the pressure transducer with the motor in a stopped condition;

determine a first status of the pressure transducer based at least in part on the first pressure;

control the motor of the draft inducer to increase a speed of the motor from the stopped condition in response to a call for heat when the first status does not indicate that the pressure transducer is unreliable; and maintain the motor in a stopped condition when the first status indicates that the pressure transducer is unreliable, wherein the processor is programmed to determine the first status by:

determining that the pressure transducer is not unreliable when the first pressure is within an expected range of pressures;

determining that the pressure transducer is not unreliable when the first pressure is not within an expected range of pressures, but controlling the motor of the draft inducer to increase the speed of the motor causes the signals output by the pressure transducer to change in an expected manner; and otherwise determining that the pressure transducer is unreliable.

8. The controller of claim 7, wherein the processor is programmed to:

determine a second pressure in the conduit from the signals output by the pressure transducer after the controller has begun increasing the speed of the motor from the stopped condition in response to a call for heat;

determine a second status of the pressure transducer based at least in part on the second pressure;

continue operating the motor when the second status does not indicate that the pressure transducer is unreliable; and stop the motor when the second status indicates that the pressure transducer is unreliable.

9. The controller of claim 8, wherein the processor is programmed to:

determine a slope of the signals output by the pressure transducer;

determine a speed of the motor of the draft inducer when the second pressure is determined; and determine the second status of the pressure transducer based on the determined slope and the determined speed.

10. The controller of claim 8, wherein the processor is programmed to:

determine a speed of the motor of the draft inducer when the second pressure is determined; and determine the second status of the pressure transducer based on the second pressure and the determined speed of the motor of the draft inducer when the second pressure is determined.

11. The controller of claim 8, wherein the processor is programmed to:

determine the second pressure before a desired pressure set point for the call for heat is expected by the controller to have been reached;

determine a third pressure in the conduit from the signal output by the pressure transducer after desired pressure set point for the call for heat is expected by the controller to have been reached;

determine a third status of the pressure transducer based at least in part on the third pressure;

continue operating the motor when the third status does not indicate that the pressure transducer is unreliable; and stop the motor when the third status indicates that the pressure transducer is unreliable.

12. The controller of claim 11, wherein the processor is programmed to:

determine a speed of the motor of the draft inducer when the third pressure is determined; and determine the third status of the pressure transducer based on the third pressure and the speed of the motor of the draft inducer when the third pressure is determined.

13. A method of controlling a gas furnace system comprising:

determining a first pressure in a conduit coupled to a draft inducer from signals output by a pressure transducer positioned to sense a pressure within the conduit with a motor of the draft inducer in a stopped condition;

determining a first status of the pressure transducer based at least in part on the first pressure;

controlling the motor of the draft inducer to increase a speed of the motor from the stopped condition in response to a call for heat when the first status does not indicate that the pressure transducer is unreliable; and maintaining the motor in a stopped condition when the first status indicates that the pressure transducer is unreliable, wherein determining the first status comprises:

determining that the pressure transducer is not unreliable when the first pressure is within an expected range of pressures;

determining that the pressure transducer is not unreliable when the first pressure is not within an expected range of pressures, but controlling the motor of the draft inducer to increase the speed of the motor causes the signals output by the pressure transducer to change in an expected manner; and otherwise determining that the pressure transducer is unreliable.

14. The method of claim 13, further comprising:

determining a second pressure in the conduit from the signals output by the pressure transducer after the controller has begun increasing the speed of the motor from the stopped condition in response to a call for heat;

determining a second status of the pressure transducer based at least in part on the second pressure;

continuing operating the motor when the second status does not indicate that the pressure transducer is unreliable; and stopping the motor when the second status indicates that the pressure transducer is unreliable.

15. The method of claim 14, further comprising:

determining a slope of the signals output by the pressure transducer; and determining a speed of the motor of the draft inducer when the second pressure is determined, wherein determining the second status of the pressure transducer comprises determining the second status of the pressure transducer based on the determined slope and the determined speed.

16. The method of claim 14, wherein the second pressure is determined determine before a desired pressure set point for the call for heat is expected by the controller to have been reached, and the method further comprises:

determining a third pressure in the conduit from the signal output by the pressure transducer after desired pressure set point for the call for heat is expected by the controller to have been reached;

determining a third status of the pressure transducer based at least in part on the third pressure;

continuing operating the motor when the third status does not indicate that the pressure transducer is unreliable; and stopping the motor when the third status indicates that the pressure transducer is unreliable.

17. The method of claim 14, further comprising determine a speed of the motor of the draft inducer when the third pressure is determined, wherein determining the third status comprises determining the third status of the pressure transducer based on the third pressure and the speed of the motor of the draft inducer when the third pressure is determined.

* * * * *